United States Patent
Butzmann

(10) Patent No.: US 7,084,619 B2
(45) Date of Patent: Aug. 1, 2006

(54) ARRANGEMENT FOR DETERMINING THE DIRECTION OF MOVEMENT OF A MOTION SENSOR ELEMENT

(75) Inventor: Stefan Butzmann, Hamburg (DE)

(73) Assignee: Koninklijke Phillips Electronics N.V., Eindhoven (NL)

( * ) Notice: Subject to any disclaimer, the term of this patent is extended or adjusted under 35 U.S.C. 154(b) by 473 days.

(21) Appl. No.: 10/122,791

(22) Filed: Apr. 12, 2002

(65) Prior Publication Data

US 2002/0175673 A1 Nov. 28, 2002

(30) Foreign Application Priority Data

Apr. 17, 2001 (DE) .......................................... 101 18 806

(51) Int. Cl.
G01P 13/00 (2006.01)
G01P 3/48 (2006.01)

(52) U.S. Cl. .................. 324/165; 324/173; 324/207.22; 341/15

(58) Field of Classification Search ................ 324/165, 324/166, 173, 174, 207.2, 207.21, 207.22, 324/207.25; 310/68 B; 341/15
See application file for complete search history.

(56) References Cited

U.S. PATENT DOCUMENTS 5,325,056 A * 6/1994 Shonowaki et al. ... 324/207.21
5,359,287 A * 10/1994 Watanabe et al. ...... 324/207.21
5,570,016 A * 10/1996 Schroeder et al. ..... 324/207.25
5,714,883 A * 2/1998 Schroeder et al. ..... 324/207.22
5,719,496 A * 2/1998 Wolf .......................... 324/165
5,892,339 A * 4/1999 Park et al. ................... 318/254
6,087,827 A * 7/2000 Oudet .................... 324/207.12
6,486,658 B1 * 11/2002 Naidu ................... 324/207.21

FOREIGN PATENT DOCUMENTS

JP 04015517 A * 1/1992
JP 04055719 A * 2/1992
JP 04335111 A * 11/1992
JP 05118874 A * 5/1993

* cited by examiner

Primary Examiner—N. Le
Assistant Examiner—Darrell Kinder

(57) ABSTRACT

An arrangement for determining the direction of movement of a motion sensor element, requiring only two sensor elements, which, in a first zone having a first pitch and extending in the form of strips along a motion co-ordinate describing a movement of the motion sensor element, comprises periodically recurrent areas alternately influencing a first magnetic field, and, in a second zone having a second pitch and extending in the form of strips along the motion co-ordinate, comprises periodically recurrent areas alternately influencing a second magnetic field, the arrangement comprising a first sensor element for detecting the influence on the first magnetic field by the first zone of the motion sensor element, and a second sensor element for detecting the influence on the second magnetic field by the second zone of the motion sensor element, the first pitch of the first zone being in an odd, integral ratio to the second pitch of the second zone, such as 1:3, 1:5, etc.

11 Claims, 3 Drawing Sheets

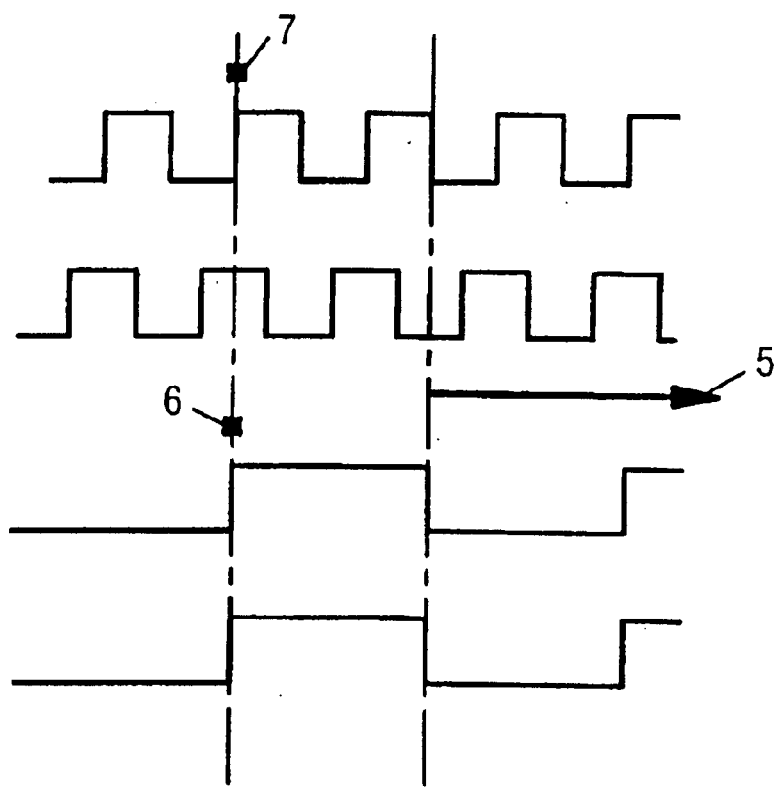
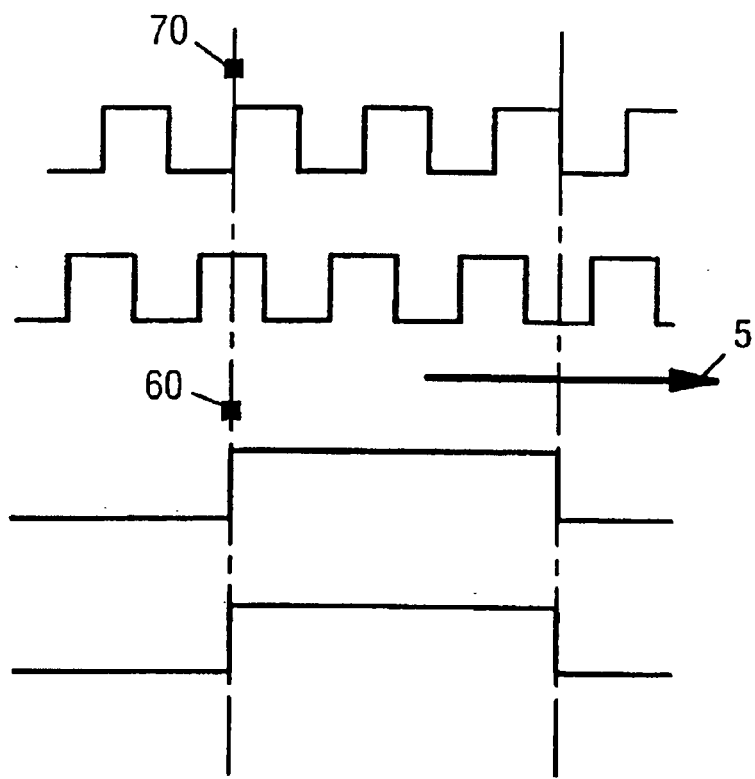

ARRANGEMENT FOR DETERMINING THE DIRECTION OF MOVEMENT OF A MOTION SENSOR ELEMENT

The invention relates to an arrangement for determining the direction of movement of a motion sensor element.

Arrangements for measuring the rotational speed of a rotating motion sensor element comprising a sensor element utilizing the magnetoresistive effect have been described. This magnetoresistive sensor element comprises four permalloy strips which are arranged on a silicon substrate in a meandering pattern and configured as a Wheatstone bridge. The magnetoresistive sensor element is sensitive along a measuring direction to the polarity and the field strength of an external magnetic field and adapted to supply a measuring signal in dependence upon a field component of the magnetic field, denoted as measuring field and measured in the measuring direction.

Since, due to the magnetoresistive effect, a rotational movement of the motion sensor element cannot be directly measured, a permanent magnet denoted as working magnet is additionally mounted on the magnetoresistive sensor element. This working magnet is struck on the rear side of the magnetoresistive sensor element or its housing so that the magnetoresistive sensor element is permeated with the magnetic field of the working magnet, although in this assembly a field component of the magnetic field will not occur in the measuring direction without the motion sensor element. The measuring signal supplied by the magnetoresistive sensor element is equal to zero in this configuration.

When a motion sensor element formed like a gear-wheel of a ferromagnetic material is arranged in the vicinity of the sensor, this will lead to a change of the field variation of the magnetic field of the working magnet. To this end, the measuring direction of the magnetoresistive sensor element is aligned in the direction of movement of the motion sensor element with respect to the teeth of the motion sensor element formed like a gearwheel of ferromagnetic material. The teeth of the motion sensor element thus move past the sensor element in this measuring direction. Along the motion co-ordinate of the motion sensor element coinciding with the measuring direction, this leads to a distortion of the field lines of the magnetic field of the working magnet in the measuring direction of the sensor element, which distortion occurs periodically with respect to the distance between the teeth of the gear-wheel-like shape of the motion sensor element. In a "symmetrical" position, in which the sensor element is centered in front of a tooth or in a gap between two teeth, the magnetic field is not distorted in the direction of movement of the motion sensor element, so that the output signal of the sensor element is equal to zero in this position. In a "non-symmetrical" position, in which the sensor element is neither centered in front of a tooth or a gap, the magnetic field is distorted in the direction of movement of the motion sensor element, which depends on the motion co-ordinate of the motion sensor element. The sensor element thereby generates an output signal which is dependent on this motion co-ordinate of the motion sensor element, which output signal may be preferably at least substantially sinusoidal on the motion co-ordinate.

A magnetized motion sensor element has also been described, in which magnetic north and south poles of alternating polarity are arranged along its direction of movement. In this form, the motion sensor element itself provides the magnetic field and thereby also the measuring field.

Such magnetoresistive sensor elements are used together with rotating motion sensor elements in diversified systems for detecting the number of revolutions of wheels, shafts or the like, coupled to the motion sensor elements. One of the most principal fields of application is their use in anti-blocking systems or as crankshaft rotational sensors in motor vehicles. The sensor is then conventionally operated in front of a gear-wheel of a magnetizable material, with four resistors connected in a Wheatstone bridge configuration, in which the measuring direction, i.e. the magnetically sensitive direction of the sensor element is parallel to the rotational direction co-ordinate of the gear-wheel in the manner described.

As described, the output signal of the Wheatstone bridge can be represented in a first approximation by a sinusoidal signal on the motion co-ordinate of the motion sensor element, in which the zero-crossings in the output signal occur before the center of a tooth or before the center of a gap between two teeth of the motion sensor element. In the case of a moved motion sensor element, the position of the motion sensor element with respect to the sensor element can be unambiguously determined from the output signal.

The arrangement described above has the drawback that an unambiguous determination of the direction of movement of the motion sensor element is not possible.

In many applications as in, for example, detecting the number of revolutions of camshafts or when operating crankshaft starter generators, an unambiguous determination of the direction of movement of the motion sensor element is desired right upon the start of operations.

It is an object of the invention to provide an arrangement for determining the direction of movement of a motion sensor element.

According to the invention, this object is solved by an arrangement for determining the direction of movement of a motion sensor element which, in a first zone having a first pitch and extending in the form of strips along a motion co-ordinate describing a movement of the motion sensor element, comprises periodically recurrent areas alternately influencing a first magnetic field, and, in a second zone having a second pitch and extending in the form of strips along the motion co-ordinate, comprises periodically recurrent areas alternately influencing a second magnetic field, the arrangement comprising a first sensor element for detecting the influence on the first magnetic field by the first zone of the motion sensor element, and a second sensor element for detecting the influence on the second magnetic field by the second zone of the motion sensor element, the first pitch of the first zone being in an odd, integral ratio to the second pitch of the second zone. An odd, integral ratio is, for example, 1:3, 1:5, etc.

The arrangement according to the invention has a simple structure. Only two sensor elements are required. Consequently, the arrangement according to the invention can be realized in a reliable and very inexpensive manner.

The first zone is preferably arranged substantially in a first main surface of the motion sensor element extending along the motion co-ordinate of the motion sensor element, and the second zone is arranged substantially in a second main surface of the motion sensor element extending along the motion co-ordinate of the motion sensor element. These main surfaces may be situated in a common plane, for example, in one plane, but they may also be separate. This provides many possibilities of variations in the constructive realization of the arrangement according to the invention.

In an advantageous further embodiment of the invention, the first sensor element is arranged opposite or next to a peripheral area, which is lateral with respect to the direction of movement, of the first zone of periodically recurrent areas alternately influencing the first magnetic field of the motion sensor element. In another embodiment of the invention, the first zone comprises two parallel sub-zones extending along the motion co-ordinate of the motion sensor element and having the same, first pitch of periodically recurrent areas alternately influencing the magnetic field, which sub-zones are offset at least substantially by half a period of the first pitch in the direction of the motion co-ordinate of the motion sensor element.

The zones or sub-zones of periodically recurrent areas alternately influencing the magnetic field are constituted by projections alternating with indentations substantially perpendicular to the assigned main surface of the motion sensor element, which projections and indentations are formed from a magnetizable material comprised by the motion sensor element. The motion sensor element is particularly formed from a ferromagnetic material and has a shape which is similar to a gear-wheel. Thus, a tooth-gap configuration, in which the teeth influence the magnetic field in a different way than the gaps, extends along the motion co-ordinate of the motion sensor element. In an example of the simplest form in the first zone of periodically recurrent areas alternately influencing the magnetic field, the motion sensor element is substantially formed as a simple gear-wheel, as already described. In this case, a very simple realization of the arrangement according to the invention is possible. In an example of a further form with a first zone consisting of two sub-zones of periodically recurrent areas alternately influencing the magnetic field, the motion sensor element in this first zone may consist of two such gear-wheels which are axially joined together and rotationally offset with respect to each other in the circumferential direction by at least substantially half a distance between two neighboring teeth at the circumference.

This embodiment of the invention advantageously comprises at least a working magnet for impressing the first and the second magnetic field on the arrangement, in which the principal direction of the magnetic field lines of the magnetic field or magnetic fields emanating from the working magnet is aligned at least substantially right-angled to the motion co-ordinate of the motion sensor element.

In a further embodiment of the invention, the zones or sub-zones of periodically recurrent areas alternately influencing the magnetic field are constituted by alternating, opposite magnetic poles of a magnetized material comprised by the motion sensor element.

In the afore-mentioned embodiments of the invention, the first sensor element is preferably a sensor element which, along a measuring direction, is sensitive to at least the polarity of the magnetic field and is adapted to supply a measuring signal in dependence upon a field component of the first magnetic field measured in the measuring direction and referred to as first measuring field, and in which the measuring direction of this first sensor element is aligned at least substantially right-angled to the motion co-ordinate of the motion sensor element.

This arrangement provides the simple possibility of gaining an output signal from the first sensor element, which output signal has an unambiguous assignment to the position of the first sensor element with respect to the motion sensor element.

At least one of the sensor elements is preferably formed as a Hall sensor element or as a magnetoresistive sensor element.

In accordance with a further embodiment of the invention, the motion sensor element may be linear. In this form, it can be advantageously used for linear motion pick-up devices. In another preferred embodiment, the motion sensor element is rotationally symmetrical and suitable for rotational motion pick-up devices.

These and other aspects of the invention are apparent from and will be elucidated with reference to the embodiments described hereinafter.

In the drawings:

FIG. 3 shows a diagram to illustrate the mode of functioning of the arrangements shown in FIGS. 1 and 2, and FIG. 4 shows a diagram to illustrate the mode of functioning of a second embodiment.

Figure 1:
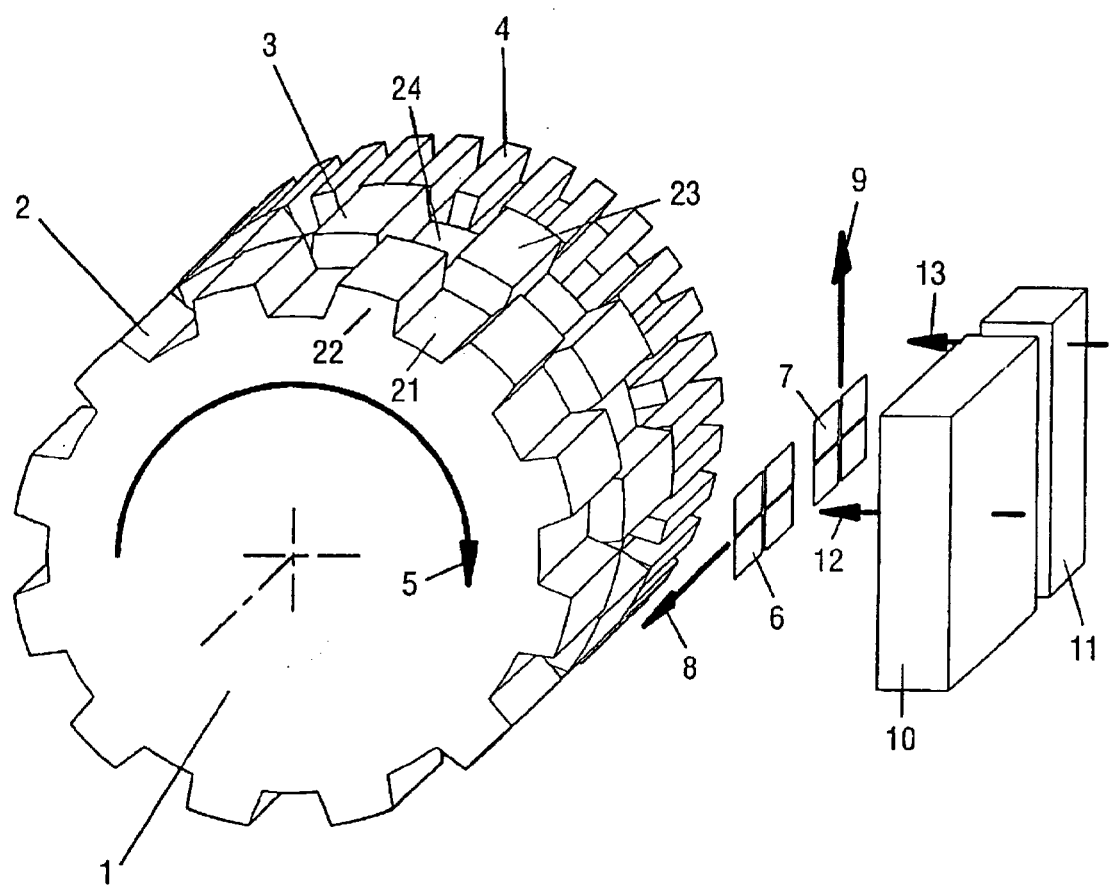
FIG. 1 shows diagrammatically a first embodiment of the invention.

In FIG. 1, the reference numeral 1 denotes an example of a rotationally symmetrical motion sensor element which has the shape of a multi-sectional toothed wheel, or gear-wheel, made of a magnetizable material. The individual parts of this gear-wheel, denoted by the reference numerals 2, 3 and 4, are axially lined up in a disc-like manner. The first of these disc-shaped parts denoted by the reference numeral 2 constitutes a first sub-zone of a first zone of periodically recurrent areas alternately influencing a magnetic field and has a first pitch, formed by projections alternating with indentations, i.e. teeth of the gear-wheel, substantially perpendicular to a main surface of the motion sensor element represented by the face of the gear-wheel of a magnetizable material from which at least these teeth are made.

The first zone of periodically recurrent areas alternately influencing a magnetic field comprises a second sub-zone, formed by the disc-shaped part 3, in the gear-shaped motion sensor element 1 shown in FIG. 1. The parts 2 and 3 of the gear-shaped motion sensor element 1 thus constitute two parallel sub-zones extending along a motion co-ordinate of the motion sensor element 1 denoted by an arrow 5 and have the same, first pitch—here the pitch of the teeth of the gear-wheel—of periodically recurrent areas alternately influencing the magnetic field which are offset by at least substantially half a period of this first pitch in the direction of the motion co-ordinate 5 of the motion sensor element 1, i.e. rotated in the circumferential direction of the gear-wheel.

The disc-shaped part 4 of the gear-wheel which adjoins the part 3 axially, substitutes a second zone of periodically recurrent areas alternately influencing a magnetic field, which is also formed by projections alternating with indentations substantially perpendicular to the assigned main surface of the motion sensor element 1—here also the face of the gear-wheel—, which is formed from a magnetizable material, i.e. by teeth having a second pitch.

The first pitch of the first zone of the motion sensor element 1 formed by the parts 2, 3 of the gear-wheel and the second pitch of the second zone of the motion sensor element 1 formed by the part 4 of the gear-wheel are in an odd, integral ratio to each other, having the value 1:3 in the embodiment of FIG. 1. One tooth-gap sequence of the gear-wheel in the first zone comes in three tooth-gap sequences in the second zone.

A first sensor element 6 is arranged opposite the first zone of the motion sensor element 1 formed by the parts 2, 3. A second sensor element 7 is positioned opposite the second zone of the motion sensor element 1 formed by the part 4 of the gear-wheel. Along a measuring direction, both sensor elements 6, 7 are sensitive to at least the polarity of a magnetic field permeating them and are adapted to supply a measuring signal in dependence upon a field component of the magnetic field measured in the measuring direction and referred to as measuring field. The measuring direction of the first sensor element 6, indicated by an arrow denoted by the reference numeral 8, is aligned at least substantially right-angled to the motion co-ordinate 5 of the motion sensor element 1, namely in the axial direction of the gear-wheel, and the first sensor element 6 is preferably aligned centrally in front of the sub-zones of the first zone of the motion sensor element 1 constituted by the parts 2 and 3 of the gear-wheel. The measuring direction of the second sensor element 7 indicated by an arrow denoted by the reference numeral 9 is aligned at least substantially parallel to the motion co-ordinate 5 of the motion sensor element 1, namely in the circumferential direction of the gear-wheel.

On its side remote from the motion sensor element 1, a first working magnet 10 formed as a permanent magnet is arranged behind the first sensor element 6 in the arrangement of FIG. 1, which working magnet impresses the arrangement consisting of gearwheel 1 and first sensor element 6 with a magnetic field in which the principal direction of the magnetic field lines, denoted by an arrow 12, of the magnetic field emanating from the first working magnet 10 is aligned substantially right-angled both to the motion co-ordinate of the gear-wheel 1, i.e. to its direction of movement 5, and to the measuring direction 8 of the first sensor element 6.

In the gear-wheel constituting the motion sensor element 1, the first zone is thus constituted by two sets of teeth which are arranged axially next to each other and offset in the direction of movement 5 of the gear-wheel, i.e. in its circumferential direction, by half a distance between two consecutive teeth. Consequently, each tooth of a first set of teeth (part 2) is adjacent to a gap of the second set of teeth (part 3) and, conversely, each gap of the first set of teeth (part 2) is adjacent to a tooth of the second set of teeth (part 3). For example, a gap 21 in the first set of teeth (part 2) is adjacent to a tooth 23 in the second set of teeth (part 3) and a tooth 22 adjoining the gap 21 in the first set of teeth (part 2) is adjacent to a gap 24 adjoining the tooth 23 in the second set of teeth (part 3).

The measuring field which is effective in the first zone in front of a respective mating of one tooth on one of the two sets of teeth formed by the tooth pitches of the parts 2 and 3 with a gap of the respective other one of these sets of teeth is constituted by the distortions of the magnetic field lines in the magnetic field of the first working magnet 10 in the axial direction of the gear-wheel 1, i.e. alternating with the teeth 23, 22, etc. of the two sets of teeth of the gear-wheel 1. The measuring field is then alternately oriented in either the same or the opposite sense to the measuring direction 8 of the first sensor element 6. Accordingly, the first sensor element 6 alternately supplies either a positive or a negative output signal upon a rotation of the gear-wheel 1. For example, in the position of the gearwheel 1, in which the mating of gap 21 with tooth 23 is situated in front of the first sensor element 6, the field lines of the magnetic field of the first working magnet 10 are deflected opposite from the measuring direction 8, namely away from tooth 23, which yields a measuring field in the negative measuring direction 8 and hence corresponds to a negative output signal. When the gear-wheel 1 is further rotated in the direction of movement 5, until the mating of tooth 22 with gap 24 is situated opposite the first sensor element 6, the field lines of the magnetic field of the first working magnet 10 are deflected in the opposite direction in front of the mating of gap 24 with tooth 22, i.e. in e measuring direction 8, which yields a measuring field in the positive measuring direction 8 and hence corresponds to a positive output signal.

As regards the output signal of the first element 6, the offset between the two sets of teeth in the circumferential direction, i.e. in the direction of movement 5, by half a distance between two consecutive teeth involves an (electrical) shift by 180°.

The first sensor element 6 supplies a first measuring signal which supplies information about the position of the motion sensor element 1 along its motion co-ordinate in the direction of movement 5. This arrangement ensures that, also in gear-wheels having a coarse first pitch in the first zone, an unambiguous assignment of the output signal of the first sensor element 6 to a given position of the motion sensor element 1 along the motion co-ordinate, i.e. in the direction of movement 5, is always given.

On its side remote from the motion sensor element 1, a second working magnet 11 also formed as a permanent magnet is arranged behind the second sensor element 7 in the arrangement shown in FIG. 1, which working magnet impresses a second magnetic field on the arrangement consisting of gear-wheel 1 and second sensor element 7, in which the principal direction of the magnetic field lines, denoted by an arrow 13, of the magnetic field emanating from the second working magnet 11 is aligned substantially right-angled to the motion co-ordinate of the gear-wheel 1, i.e. to its direction of movement 5.

In the arrangement shown in FIG. 1, the teeth of the part 4 of the gear-wheel 1 constitute the second strip-shaped zone of periodically recurrent areas alternately influencing a second measuring field which is constituted by a field component of the magnetic field emanating from the second working magnet 11 parallel to the direction of movement 5 and is not explicitly shown in FIG. 1. This second measuring field is produced by the deflection of the magnetic field lines towards the flanks of the teeth of the part 4 of the gear-wheel 1. The second measuring field is thus aligned at least substantially parallel both to the direction of movement 5 of the motion sensor element 1 and to the measuring direction 9 of the second sensor element 7. The second sensor element 7 supplies a second measuring signal which, first of all, is used for measuring the speed of motion of the motion sensor element 1 in the direction of movement 5.

By combining the information obtainable from the first and the second measuring signal, additional information about the direction of rotation can be gained without using any further sensor element. This is based on the fact that in the arrangement of pitches of the first and the second zone according to the invention, different measuring signals are supplied at the first sensor element at an interface between a gap and a tooth of the first zone, dependent on whether the direction of rotation of the motion sensor element 1 is the same as or opposite to the direction of movement 5. In other words, this is achieved in that the length of a tooth or a gap is obtained from the product of the tooth pitch, i.e. the distance between the teeth, in the second zone with the sum of an integral number, namely 1, 2, . . . , and the dimensional ratio between the tooth and the gap of the second zone.

FIG. 3 shows diagrammatically the spatial assignment of the tooth pitch of the second zone in a sub-diagram a) to the tooth pitch of the first zone in the sub-diagram c), and the electrical assignment of the first measuring signal of the first sensor element 6 in the sub-diagram d) to the second measuring signal of the second sensor element 7 in the sub-diagram b). The spatial position of the sensor elements 6, 7 with respect to the tooth pitches in the zones, as well as the direction of movement 5 are shown in the diagram of FIG. 3.

When the gear-wheel 1 rotates in the direction of movement shown in FIG. 3, the second measuring signal of the second sensor element 7 has a different polarity upon the zero-crossing of the first measuring signal of the first sensor element 6, i.e. upon the transition from a tooth to a gap in the first zone, as compared with a movement which is opposed to the direction of movement marked by the direction of the arrow.

Figure 2:
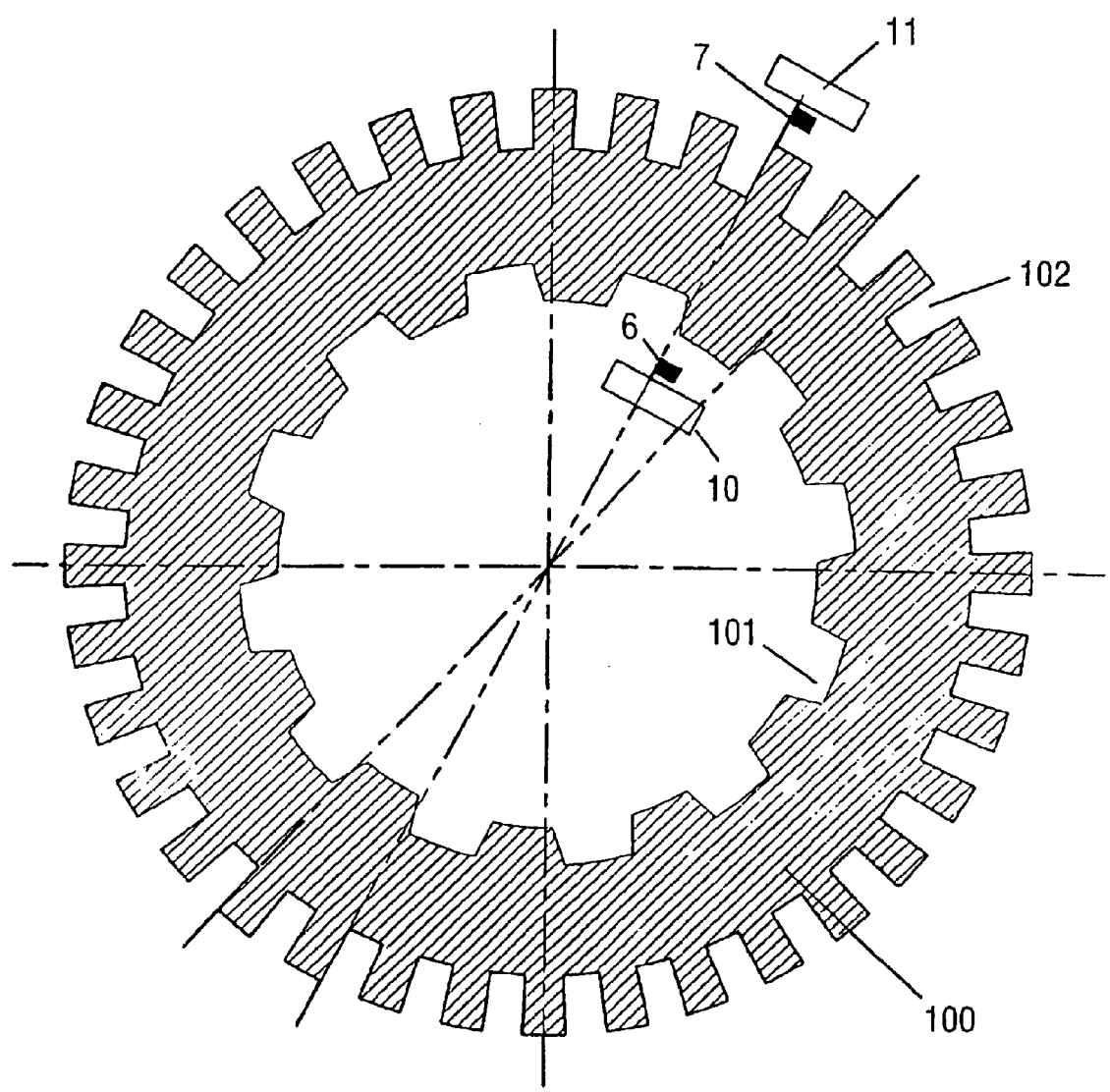
FIG. 2 shows diagrammatically a second embodiment of the invention.

FIG. 2 shows a modification of the arrangement of FIG. 1, in which, instead of an axial alignment, the first zone of periodically recurrent areas alternately influencing a first magnetic field is accommodated in an inner set of teeth 101, and the second zone of periodically recurrent areas alternately influencing a second magnetic field is accommodated in an outer set of teeth 102 of a gear-wheel 100. The pitches of the sets of teeth 101, 102 and their mutual orientation, as well as their orientation to the first sensor element 6, the first working magnet 10, the second sensor element 7 and the second working magnet 11 correspond to those in the arrangement shown in FIG. 1.

In a further embodiment of the invention, FIG. 4 shows diagrammatically and similarly as in FIG. 3 the spatial assignment of the tooth pitch of the second zone in the sub-diagram a) to the tooth pitch of the first zone in the sub-diagram c), and the electrical assignment of the first measuring signal of a first sensor element 60 in the sub-diagram d) to the second measuring signal of a second sensor element 70 in the sub-diagram b). The spatial position of the sensor elements 60, 70 with respect to the tooth pitches in the zones, as well as the direction of movement 5 are shown diagrammatically in FIG. 4. In contrast to FIG. 3, the arrangement shown here has a ratio of 1:5 between the first pitch of the first zone and the second pitch of the second zone, i.e. a finer second pitch as compared with the first pitch. Apart from this, this arrangement corresponds to that shown in FIG. 3.

What is claimed is:

1. An arrangement for determining the direction of movement of a motion sensor element which, in a first zone having a first pitch and extending in the form of strips along a motion co-ordinate describing a movement of the motion sensor element, comprises periodically recurrent areas alternately influencing a first magnetic field, and, in a second zone having a second pitch and extending in the form of strips along the motion co-ordinate, comprises periodically recurrent areas alternately influencing a second magnetic field, the arrangement comprising a first sensor element for detecting the influence on the first magnetic field by the first zone of the motion sensor element, and a second sensor element for detecting the influence on the second magnetic field by the second zone of the motion sensor element, the first pitch of the first zone being in an odd, integral ratio to the second pitch of the second zone, and wherein the first zone comprises two sub-zones extending along the motion co-ordinate of the motion sensor element and having the same, first pitch of periodically recurrent areas alternately influencing the magnetic field, which sub-zones are offset at least substantially by half a period of the first pitch in the direction of the motion co-ordinate of the motion sensor element.

2. An arrangement as claimed in claim 1, characterized in that the first zone is arranged substantially in a first main surface of the motion sensor element extending along the motion co-ordinate of the motion sensor element, and in that the second zone is arranged substantially in a second main surface of the motion sensor element extending along the motion co-ordinate of the motion sensor element.

3. An arrangement as claimed in claim 1, characterized in that the first sensor element is arranged opposite or next to a peripheral area, which is lateral with respect to the direction of movement, of the first zone of periodically recurrent areas alternately influencing the first magnetic field of the motion sensor element.

4. An arrangement as claimed in claim 2, characterized in that the zones or sub-zones of periodically recurrent areas alternately influencing the magnetic field are constituted by projections alternating with indentations substantially perpendicular to the assigned main surface of the motion sensor element, which projections and indentations are formed from a magnetizable material comprised by the motion sensor element.

5. An arrangement as claimed in claim 4, characterized by at least a working magnet for impressing the first and the second magnetic field on the arrangement, in which the principal direction of the magnetic field lines of the magnetic field or magnetic fields emanating from the working magnet is aligned at least substantially right-angled to the motion co-ordinate of the motion sensor element.

6. An arrangement as claimed in claim 2, characterized in that the zones or sub-zones of periodically recurrent areas alternately influencing the magnetic field are constituted by alternating, opposite magnetic poles of magnetized material comprised by the motion sensor element.

7. An arrangement as claimed in claim 3, characterized in that, along a measuring direction, the first sensor element is sensitive to at least the polarity of the magnetic field and is adapted to supply a measuring signal in dependence upon a field component of the first magnetic field measured in the measuring direction and referred to as first measuring field, and in that the measuring direction of the first sensor element is aligned at lease substantially right-angled to the motion co-ordinate of the motion sensor element.

8. An arrangement as claimed in claim 1, characterized in that at least one of the sensor elements is a Hall sensor element.

9. An arrangement as claimed in claim 1, characterized in that at least one of the sensor elements is a magnetoresistive element.

10. An arrangement as claimed in claim 1, characterized in that the motion sensor element is linear.

11. An arrangement as claimed in claim 1, characterized in that the motion sensor element is rotationally symmetrical.

* * * * *